(12) United States Patent
Aboujaoude et al.

(10) Patent No.: US 7,978,605 B2
(45) Date of Patent: *Jul. 12, 2011

(54) METHODS AND APPARATUS FOR DIRECTORY ENABLED NETWORK SERVICES

(75) Inventors: Roger Aboujaoude, Asbury Park, NJ (US); Hossein Eslambolchi, Los Altos Hills, CA (US); John Robert McCanuel, Bailey, CO (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/234,835

(22) Filed: Sep. 22, 2008

(65) Prior Publication Data
US 2009/0022281 A1 Jan. 22, 2009

Related U.S. Application Data

(63) Continuation of application No. 10/746,413, filed on Dec. 24, 2003, now Pat. No. 7,433,350.

(51) Int. Cl.
H04L 12/26 (2006.01)
H04M 3/22 (2006.01)
G06F 15/177 (2006.01)
(52) U.S. Cl. ........ 370/232; 370/238; 370/352; 379/1.03
(58) Field of Classification Search ........................ None
See application file for complete search history.

(56) References Cited

U.S. PATENT DOCUMENTS

| | | | | |
|---|---|---|---|---|
| 5,940,373 A * | 8/1999 | Chiu et al. | 370/238 |
| 6,154,523 A * | 11/2000 | Hofmann et al. | 379/22 |
| 6,345,239 B1 * | 2/2002 | Bowman-Amuah | 703/6 |
| 6,473,398 B1 * | 10/2002 | Wall et al. | 370/229 |
| 6,826,620 B1 * | 11/2004 | Mawhinney et al. | 709/235 |
| 6,912,575 B1 * | 6/2005 | Swift et al. | 709/226 |
| 2004/0073436 A1 * | 4/2004 | Vaishnavi | 705/1 |
| 2004/0221027 A1 * | 11/2004 | Parrott | 709/223 |

* cited by examiner

*Primary Examiner* — Pankaj Kumar
*Assistant Examiner* — Marcus R Smith
(74) *Attorney, Agent, or Firm* — Akerman Senterfitt; Michael K. Dixon

(57) ABSTRACT

Methods and apparatus for controlling the rules of engagement between a telecommunication carrier and a customer whose network is managed by the telecommunication carrier are provided. A computer system interviews a customer by determining a set of specific questions tailored to the customer's needs, the set of specific questions based on previously stored customer information. Answers to the asked questions are stored as an entry in a master user profile. The master user profile defines the rules of engagement of how the telecommunication carrier shall operate on behalf of the customer on each subsequent transaction without the need of the customer's direct involvement on each element of the transaction. The entry has an associated event and a corresponding action to perform in response to the occurrence of the associated event. Upon receipt of an event occurrence, the corresponding action which includes interoperating with existing telecommunication carrier systems is performed.

17 Claims, 8 Drawing Sheets

| 400 | EVENT | PRECONDITIONS | HANDLING/ACTIONS | NOTIFICATION | TYPE OF NOTIFICATION | MEDIUM FOR NOTIFICATION | SERVICE SPECIFIC ENTRIES |
|---|---|---|---|---|---|---|---|
| 410 ORDERING | ORDERING DS0 | DS0 EXCEED 8 | ORDER T1.5, DISCONNECT THE DS0s, CANCEL DS0 ORDER | YES | EMAIL CUSTDIR@CUS.COM | INTERNET | |
| DISASTER RECOVERY | | | | | | | |
| BILLING | | | | | | | |
| 412 CONGESTION | TRAFFIC EXCEED CIR | PORT TRAFFIC HANDLES TRAFFIC, TRANSPORT TRAFFIC HANDLES NEW PORT SIZE. | UPGRADE PVC, UPGRADE TRANSPORT, UPGRADE PORT | YES | EMAIL CUSTDIR@CUS.COM | PDA | |
| TROUBLE REPORTING | | | | | | | |
| NETWORK ALARMS | | | | | | | |
| 414 SECURITY | TRAFFIC RATIO IMBALANCE | EXTRACT TRAFFIC SIGNATURE; COMPARE TRAFFIC SIGNATURE WITH KNOWN VIRUS SIGNATURES. | LOOP BACK CIRCUIT OR PVC | YES | IVR | PHONE | |
| 416 DISCONNECT | | | LOOP BACK CIRCUIT BEFORE PERFORMING HARD DISCONNECT | YES | EMAIL CUSTDIR@CUS.COM | INTERNET | |
| OPERATION OPTIMIZATION | | | | | | | |
| NEW OFFERS | | | | | | | |
| RE-HOME | | | | | | | |

FIG. 4

| 400 | | 420 | 430 | 440 | 450 | 460 | 470 | 480 |
|---|---|---|---|---|---|---|---|---|
| | | EVENT | PRECONDITIONS | HANDLING/ACTIONS | NOTIFICATION | TYPE OF NOTIFICATION | MEDIUM FOR NOTIFICATION | SERVICE SPECIFIC ENTRIES |
| 410 | ORDERING | ORDERING DS0 | DS0 EXCEED 8 | ORDER T1.5, DISCONNECT THE DS0s, CANCEL DS0 ORDER | YES | EMAIL CUSTDIR@CUS.COM | INTERNET | |
| | DISASTER RECOVERY | | | | | | | |
| | BILLING | | | | | | | |
| 412 | CONGESTION | TRAFFIC EXCEED CIR | PORT TRAFFIC HANDLES TRAFFIC, TRANSPORT TRAFFIC HANDLES NEW PORT SIZE. | UPGRADE PVC, UPGRADE TRANSPORT, UPGRADE PORT | YES | EMAIL CUSTDIR@CUS.COM | PDA | |
| | TROUBLE REPORTING | | | | | | | |
| | NETWORK ALARMS | | | | | | | |
| 414 | SECURITY | TRAFFIC RATIO IMBALANCE | EXTRACT TRAFFIC SIGNATURE; COMPARE TRAFFIC SIGNATURE WITH KNOWN VIRUS SIGNATURES. | LOOP BACK CIRCUIT OR PVC | YES | IVR | PHONE | |
| 416 | DISCONNECT | | | LOOP BACK CIRCUIT BEFORE PERFORMING HARD DISCONNECT | YES | EMAIL CUSTDIR@CUS.COM | INTERNET | |
| | OPERATION OPTIMIZATION | | | | | | | |
| | NEW OFFERS | | | | | | | |
| | RE-HOME | | | | | | | |

| EVENTS | EVENT DESCRIPTION |
|---|---|
| TRAFFIC RATIO IMBALANCE | Ratio of Denial-of-Service Traffic Relative to all Traffic exceeded Customer Set Ratio. |
| TRAFFIC EXCEED CIR | Committed Information Rate was exceeded at least once in a period of 15 minutes. |
| ORDERING DS0 | An order is being placed for a DS0. |
| CIRCUIT ALARM | A failure condition on a logical or physical circuit. |
| OPEN TICKET | A documented failure condition in a maintenance system. The ticket's state is active. |
| NODE OUT OF SERVICE | A failure of a logical or physical network node. |
| PACKETS DROPPED | A condition caused by congestion or noise that causes packets to be dropped between nodes. |
| TOTAL DISCONNECT | Disconnecting a service and all its related features. |
| FACILITY FAILURE | A failure of a physical circuit. |
| NEW PORT ORDER | Ordering a new ATM, Frame, or IP port. |
| NODE CONGESTIONS | Traffic congestion at a network node. |

FIG. 5B

| ACTION | ACTION DESCRIPTION |
|---|---|
| ORDER T1.5 | Replace the DS0 Order with a T1.5 Order into the Integrated Order Manager (IOM) as described by DENS ordering |
| DISCONNECT AT THE DS0S | Place DS0 Disconnect orders into IOM as described by DEMS Disconnect Process |
| UPGRADE PVC | Perform a MACD order to upgrade PVC CIR based on the next available PVC speed and not to exceed the ports capacity rules |
| TERMINATE TRAFFIC SOURCE | Soft Disconnect PVC or Device Generating Questionable Traffic, using Network Element Management System |
| UPGRADE PORT SPEED | Increase the speed of the port to the next level speed. |
| UPGRADE TRANSPORT SPEED | Upgrade bandwidth or facility speed to the next level speed. |
| LOOPBACK PVC | Logically disconnect a PVC. |
| CLOSE TROUBLE TICKET | Close the document failure conditions. The ticket's state becomes inactive. |
| CLEAR ALARM | An action not to show the alarm event. |
| OPEN TROUBLE TICKET | An action to document a failure condition for tracking purposes. |
| ACTIVATE PORT | An action to turn up an ATM, Frame, or IP port to enable service on the port. |

METHODS AND APPARATUS FOR DIRECTORY ENABLED NETWORK SERVICES

FIELD OF THE INVENTION

The present invention relates generally to improved methods and apparatus for managing customer network activities, and, more particularly, to advantageous techniques for providing customer control over an interaction between the customer's network and operations and a telecommunication carrier network.

BACKGROUND OF THE INVENTION

Telecommunication carriers provide many services to their customers and each of these services requires the involvement of many heterogeneous systems to provision and maintain such services. Specifically, telecommunication carriers have telecommunication networks which connect and manage the services provided to their customers' networks. For example, telecommunication carriers provide services such as voice grade communication channels, frame relay services, nodal services, internet protocol (IP) services, and the like. Many of these services allow for a customer to make voice or data calls which terminate outside the customer's network and to receive calls which originate outside the customer's network. Other services provided by a telecommunication carrier include providing high speed data links to allow data to be transmitted externally from the customer's network and received from external parties to the customer's network. Many of the facilities which carry voice, data, or both require change management which depends on the individual needs of the customer.

Customers' needs vary depending on their business practices and policies, technologies, optimization routines, network designs, outstanding service orders, and existing service inventories. These needs drive how each customer interacts with a telecommunication carrier. For example, one customer may emphasize providing reliable external network access while another customer may emphasize limiting their telecommunication financial expenses at the expense of service quality. Enterprise customers may have large and complex networks while smaller customers may have small and simple networks. In any case, customers' needs may further depend on their own corporate demographics such as corporate size, their network's size, their business objectives, their financial cost structure, and the market in which they operate.

Today's interaction between customers and telecommunication carriers typically involve a customer calling a carrier's call center or a customer requesting a service or service modification through a session over the Internet provided by a telecommunication carrier's website. Each time a customer wants to make a change to an existing service or manage an interaction between the customer's network and the telecommunication carrier's network, a separate phone call or Internet session is required. Each time much of the same information is requested from the customer as has been previously provided during previous orders to tailor the service to their liking. For example, a customer, because of its network growth, may require an additional 64 kb/sec (DS0) voice channel to be connected to the customer's PBX network. The customer calls the telecommunication carrier's call center or logs on to the carrier's website to make the request. Each time the customer's network grows, the customer has to make a request to expand the carrier's service requiring the customer's direct attention. Further, perhaps an additional DS0 voice channel would put the customer over a threshold amount of DS0 voice channels where it becomes more cost effective to lease an entire T1.5 line. Unless the carrier prompts the customer, the customer may miss the opportunity to optimize their connection while saving on telecommunication expenses. In specifying the details of the T1.5 line, the customer may have to specify many of the details which are common to those specified on a previous T1.5 order. However, even if the details had commonalities with a previous T1.5 order, there exists no control system to determine which details of what order could be leveraged for the present T1.5 order.

Furthermore, many existing heterogeneous telecommunications systems exist today which manage the interaction with customers such as an inventory system, an ordering system, a trouble reporting system, an alarm system, a billing system, and the like. Over time these systems and the services offered through these systems have become complex such that it becomes extremely difficult for a telecommunication carrier salesperson to be aware of all the services that could be offered to a customer. For that matter, it becomes even more difficult to determine which services best fit the particular needs of the customer.

Clearly, methods and systems are needed to achieve automated customer control of network management activities when a particular event such as customer network growth, network utilization, computer virus intrusion, network failure, disaster recovery or the like occurs. Such automated control of customer network management activities should reflect the customer's business policies and procedures in addition to the customer's optimization routines, the customer's network designs, customer's services ordered, and the customer's existing inventories.

SUMMARY OF THE INVENTION

The present invention provides software to allow a telecommunication carrier customer to specify particular network actions which are triggered by the occurrence of a specified network event. Similarly, multiple events may be specified to trigger one or more specified network actions or operations. A network action may include, for example, automatically ordering additional network bandwidth when an event is generated based on receiving a network congestion condition. The network action may be performed in such a way to consider the customer's business policies and procedures, the customer's optimization routines, the customer's network designs, the customer's previously ordered services, and the customer's existing inventories.

For example, a policy may be in place to only order additional network capacity at the end of the company's budget cycle even if network congestion reaches a predefined threshold. Another example may include specifying a person or a select group of people to be notified whenever a specified event occurs or whenever a specified action is triggered. Such notification media may include e-mail, pager, telephone, or other suitable notification media.

To these ends, the present invention includes the creation of a master user profile on a per customer basis which contains the rules of engagement of how the telecommunication carrier shall operate on behalf of a customer. A wizard program module is utilized to determine a set of questions to ask the customer. The questions are selected from a rules directory and tailored to the customer's needs by being based on previously stored customer information. The wizard program receives customer answers and stores them in the form of one or more entries in a master user profile. Each entry has an associated event and a corresponding action representing an operation to perform in response to an occurrence of the associated event. Upon the occurrence of an event, an asynchronous trigger module retrieves the master user profile associated with the customer for which the event was received and performs the action corresponding to the occurrence of the associated event.

The present invention advantageously reduces response time intervals between taking action and the occurrence of a network event. Additional benefits of the present invention include providing predictable and repeatable behavior by removing human elements from each transaction and enforcing rules of engagement between a customer and the telecommunication carrier to ensure a consistent service offering to the customer.

A more complete understanding of the present invention, as well as, further features and advantages of the invention, will be apparent from the following Detailed Description and the accompanying drawings.

BRIEF DESCRIPTION OF THE DRAWINGS

FIG. 4 illustrates an exemplary master user profile in accordance with the present invention.

FIG. 5A is a table containing an exemplary list of actions that may be performed in accordance with the present invention.

FIG. 5B is a table containing an exemplary list of events that may be performed in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
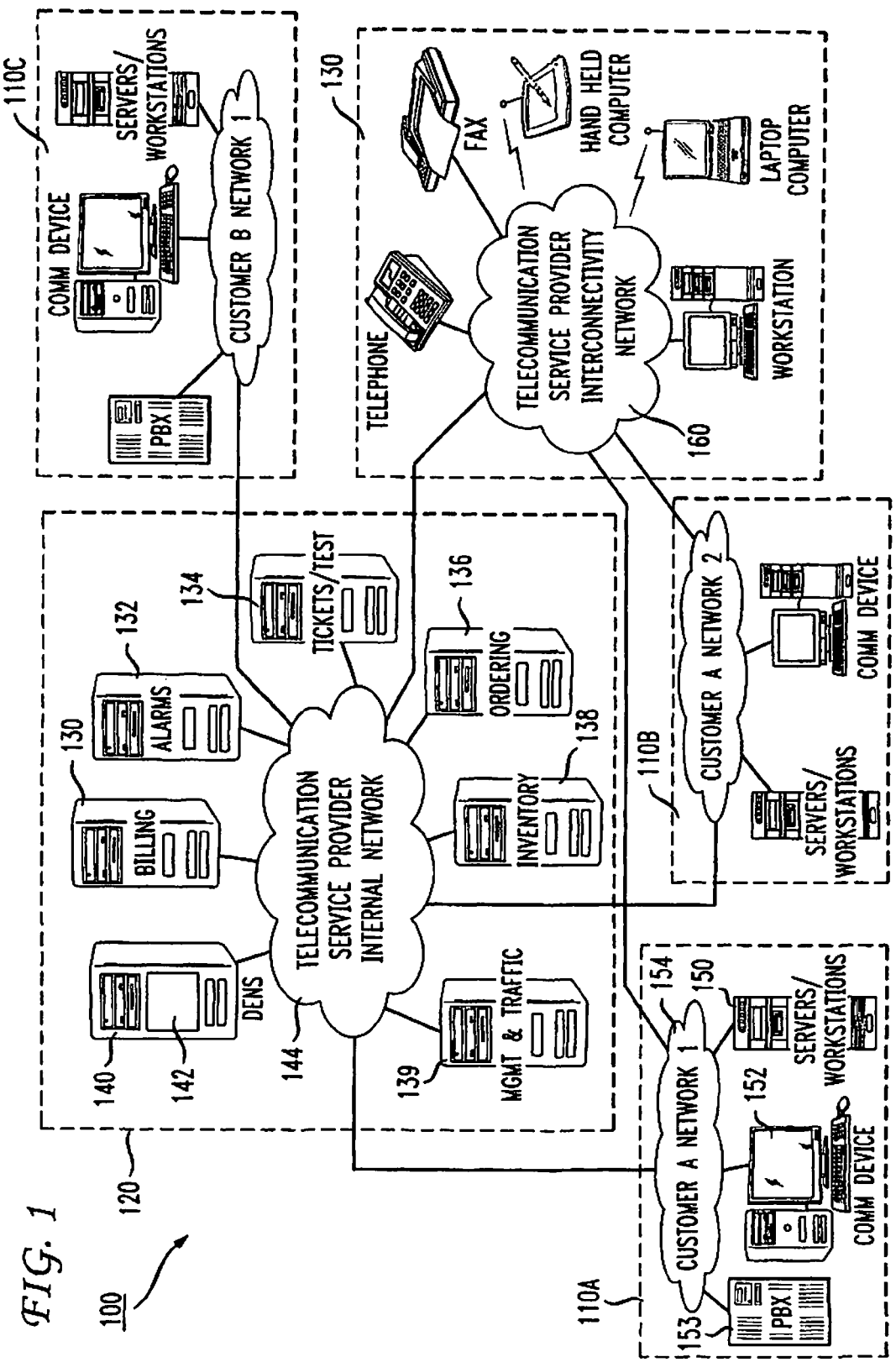
FIG. 1 illustrates an exemplary network in which the present invention may be advantageously employed.

FIG. 1 illustrates an exemplary network 100 having customer networks 110A-110C, a telecommunication service provider's operations and maintenance network 120, and a managed network 130 designed to carry voice and data traffic between customer networks and external to customer networks. The customer networks 110A-110C typically are networks of business customers which contract for services such as asynchronous transfer mode (ATM) frame relay services, nodal services, virtual private network (VPN), voice circuit services, disaster recovery services, and the like from the telecommunications service provider.

Although multiple customer networks are shown in FIG. 1, customer network 110A is representative of the other customer networks and is described in more detail. Customer network 110A may include a server/workstation 150 which represents one or more servers, workstations, and other network devices and a communication device 152 which represents a mobile or land line telephone, pager, fax machine, palm computer, or the like. The server/workstation 150 and communication device 152 may connect to the customer network through wire, wireless or a combination of wire and wireless connections. Customer network 110A may include a private branch exchange (PBX) 153 to connect trunk services to the managed network 130 for carrying voice and data traffic. It is noted that customers may have multiple heterogeneous networks such as customer A, for example, which utilizes PBX support services for network 110A and Centrex services for network 110B.

The managed network 130 includes the interconnectivity network 160 and a variety of exemplary communication devices. Depending on the subscribed service, managed network 130 may represent an ATM wide area network, a public switched telephone network (PSTN), a high speed packet network utilizing an internet protocol (IP), and the like.

The operations and maintenance network 120 provides services and the management of those services to customers. The operations and maintenance network includes computers 130, 132, 134, 136, 138, 139, and 140 which are connected together by network 144. Computer 130 runs a billing application which tracks the accrued customer costs for subscribed services and issues bills to subscribing customers. Computer 132 runs an alarm application which tracks and reports occurrences of alarms affecting subscribed services within managed network 160 and the interfaces between a customer network and the telecommunication service provider network. Computer 134 runs a trouble reporting and test application which allows customers to report problems with subscribed services and track the resolution of those reported problems. Additionally, the trouble reporting and test application provides the customer with mechanisms to test customer subscribed circuits.

Computer 136 runs an ordering application to allow customers to add, remove, and modify offered telecommunication services. The ordering application receives the order request and distributes the necessary work requests to complete the order request. Computer 138 runs an inventory application which tracks all the customer's subscribed services on one customer network or across multiple customer networks which may span multiple geographical locations. For example, as shown in FIG. 1, a first customer, Customer A, maintains first and second networks 110A and 110B, respectively.

The inventory application also stores a history of services purchased by a customer. Computer 139 runs a management and traffic reporting system which collects traffic statistics on each customer's connection to the managed network 130. The management and traffic reporting system determines on a per customer basis, for example, voice circuit utilization, bandwidth utilization, the data rate offered by the customer to the managed network versus the data rate purchased by the customer, and the like.

Computer 140 runs a directory enable network services (DENS) application 142 in accordance with the present invention. As described in further detail in connection with the discussion of FIGS. 2-5 below, the DENS application 142 provides a three phase approach to managing subscribed services relative to customer needs to define a customer relationship. The first phase includes interviewing the customer about the way a telecommunication carrier needs to act on behalf of the customer. The interview is driven by a profile wizard which constructs a dynamic decision tree. The dynamic decision tree is tailored to the customer as described in accordance with FIG. 3. After completing the interview, a master customer profile is created on behalf of the customer as described in connection with the disclosure of FIG. 4. The master customer profile is active because it may contain instructions to take an action upon the occurrence of an event generated by the operations and maintenance network 120 or the managed network 130 on behalf of the customer without involving direct customer attention. The master customer profile acts as a proxy on behalf of the customer. Thus, the master customer profile dictates the relationship between the customer and all the customer's users and systems with the telecommunication carrier and its private systems such as billing, ordering, inventory and the like according to the events and optional conditions defined within the master customer profile. The proxy ensures limited and secure access to the private systems.

The second phase includes receiving events based upon network operations, customer behavior, and the like. The third phase includes performing a corresponding action in response to an event received by the DENS application 142. The corresponding action may be proactive or reactive. A proactive action applies to a new service order and may require satisfying additional predetermined conditions in response to the received event. For example, if a customer's network operator places an order for an additional DS0, the proactive action checks the customer's current inventory to determine if adding the new DS0 exceeds a threshold of DS0s. If so, the proactive action would automatically order an entire T1.5 and transfer the existing DS0s to the new T1.5 to save the customer expenses. A reactive action applies to existing service subscriptions and like a proactive action may optionally include executing additional predetermined conditions in response to the received event. For example, a reactive action includes an action to convert all DS0 groups having more than 8 DS0s to a T1.5 in response to an event to analyze DS0 groups for a particular customer. Each action whether it is proactive or reactive may vary and may involve access to the private systems. Examples of events and actions will be described further in connection with the discussion of FIGS. 5A and 5B.

Those of ordinary skill in the art will appreciate that the exemplary networks and overall implementation depicted in FIG. 1 may vary, and that the depicted example is solely for illustrative purposes and is not meant to imply architectural limitations with respect to the present invention. It is noted that although FIG. 1 shows applications running on individual computers 130, 132, 134, 136, 138, 139, and 140, each application may be distributed to run on a group of networked computers as well.

Figure 2:
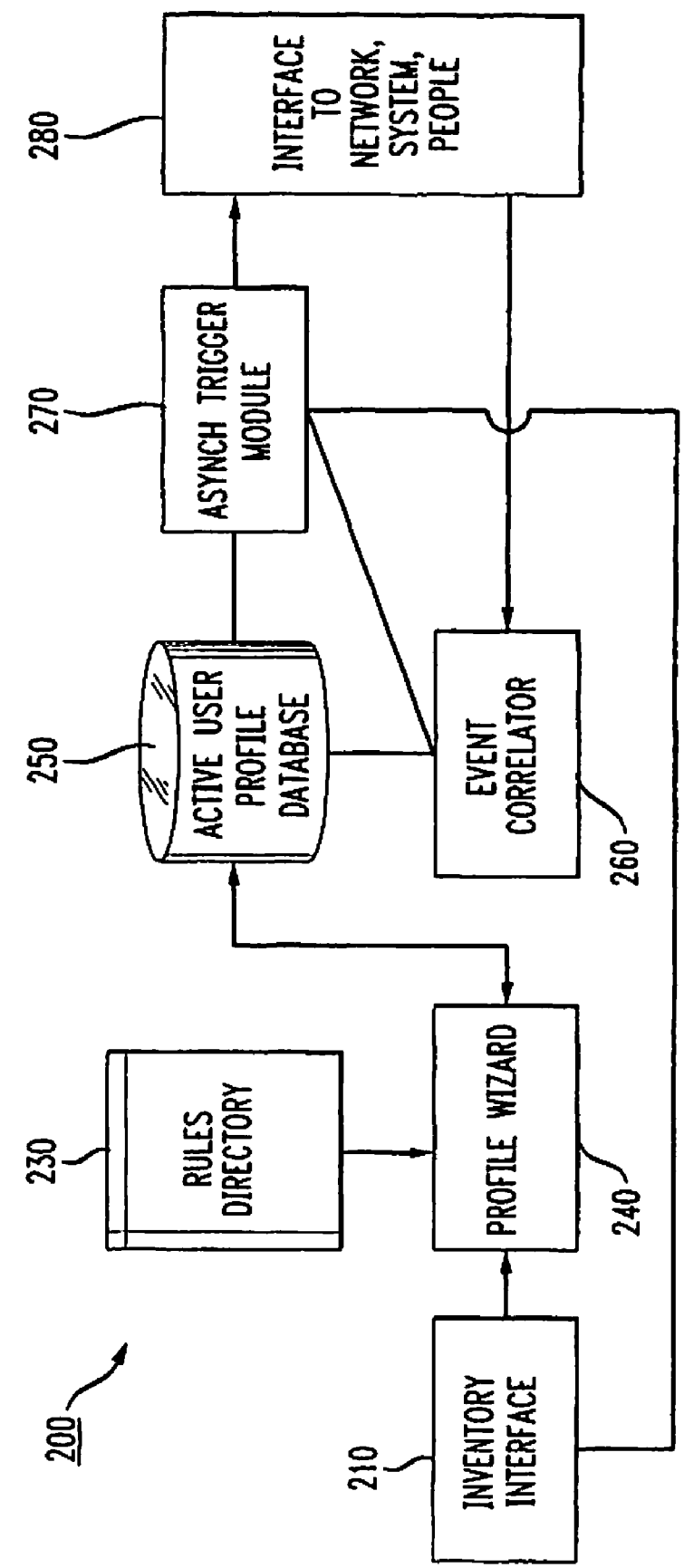
FIG. 2 shows a block diagram illustrating functional software components in accordance with a preferred embodiment of the present invention.

FIG. 2 shows a block diagram 200 illustrating the functional software components of a directory enabled network services (DENS) application 142 in accordance with a preferred embodiment of the present invention. The DENS application 142 includes an inventory interface 210, a rules directory 230, a profile wizard 240, an active user profile database 250, an asynchronous trigger module 270, and a network interface 280 which includes interfaces to systems such as AT&T's integrated order manager, e-maintenance, an alarm viewer, and a flow through management system.

During an interview with a customer, the customer using a web browser, for example, accesses the profile wizard 240 through a business portal interface such as AT&T's BusinessDirect®. For example, the customer may logon on to the BusinessDirect® application over the Internet. The business portal interface forwards a uniform resource locator (URL) representing the server location of the profile wizard 240 to the customer's web browser over existing IP protocols. The profile wizard 240 interviews the customer on a per service basis by prompting the customer with questions and receiving answers from the customer. The profile wizard 240 determines customer tailored questions by accessing historical information concerning the customer, accessing the customer's subscribed services through the inventory interface 210, and retrieving applicable questions from the rules directory 230 based on the historical and other learned customer information and responses provided by the customer on previously asked questions. Historical information may include information gathered from previous interactions between the customer and the telecommunication carrier. The rules directory 230 is typically stored on permanent storage such as a disk and written to random access memory (RAM) during application runtime for quick access.

Figure 3:
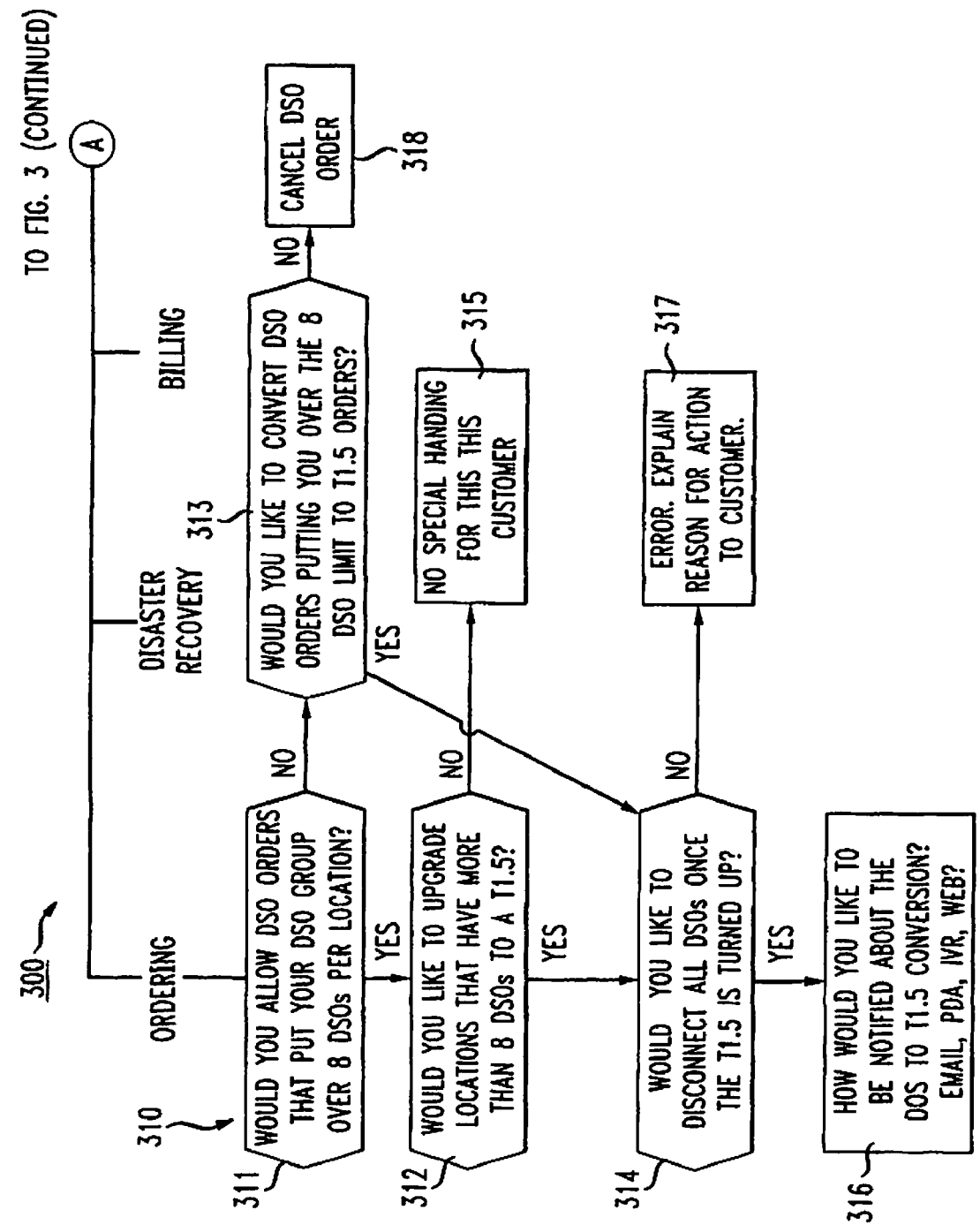
FIG. 3 illustrates an exemplary decision tree constructed by a profile wizard in accordance with the present invention.
Figure 3:
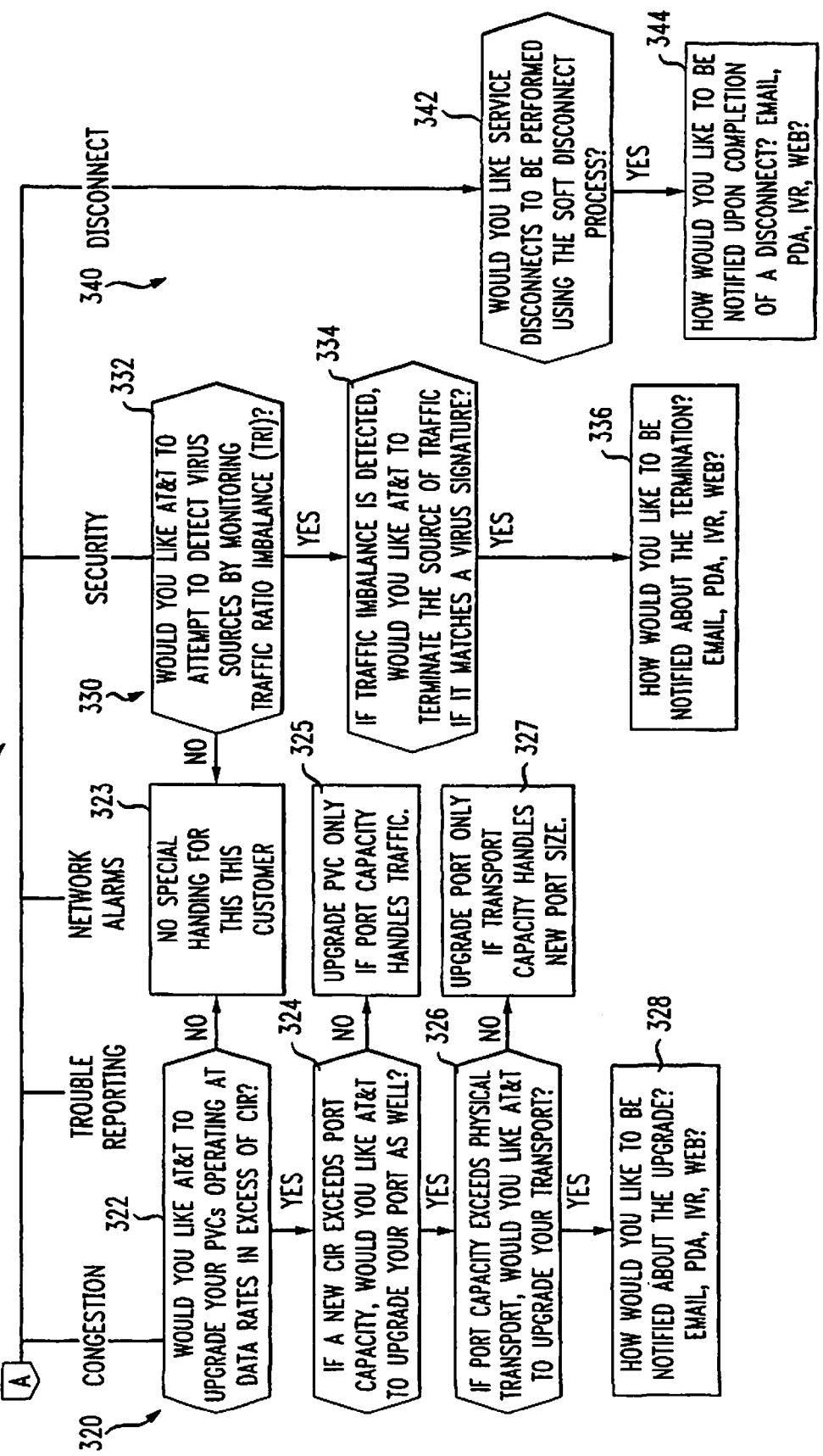

An example of the decision tree is shown in FIG. 3 and described further below. The wizard constructs the questions from rules in the rules directory and asks the customers only those questions that pertain to their specific situation. Examples of questions include:

Would you like to perform soft or hard disconnect when you decide to disconnect service?

Would you like to upgrade existing locations that have more than 8 DS0s to a T1.5?

Would you allow DS0 orders that put your DS0 group over 8 DS0s per location, or would you like to convert the orders to T1.5?

Do you want AT&T to upgrade your permanent virtual circuits (PVC) which have been operating at data rates that exceed committed information rate (CIR)?

Do you want AT&T to detect virus conditions using traffic signatures and alert you to the sources of virus-like traffic?

After completing the interview with the customer, the profile wizard 240 writes an active master profile into the user profile database 250. The active master profile dictates the communication with the customer and may contain actions to perform in response to events received. The specific actions and events are determined by the customer responses gathered for each individual service to which an interview was conducted. An example of an active master profile is shown in FIG. 4 and described further below. The event correlator 260 periodically reads the user profile database 250 to determine whether an event should be processed by the DENS system for the specific customer. The event correlator 260 filters duplicate or inconsequential events which may arise because of lack of interest in the profile as well as network conditions such as alarms due to failure of interdependent technologies.

The network interface 280 may include software interfaces to system software operating the managed network 130, the maintenance and operations network 120, and/or software applications. The network interface 280 provides access to the DENS system for receiving events and executing actions. In addition to generating events due to a networks state, the system software also supports manual entry of events by telecommunication operators or customers. When an event is received by the event correlator 260 through the network interface 280, the event correlator 260 determines whether the received event should be filtered or further processed. If it is to be further processed, the event is sent to the asynchronous trigger module 270 where it extracts the master customer number (MCN) from the event. The asynchronous trigger module 270 retrieves an associated active master profile by issuing a database query containing the MCN on the user profile database 250. The asynchronous trigger module 270 reads the active master profile to determine if the received event in combination with optional predetermined conditions in the master profile is satisfied to result in performing or causing to perform the associated action. If conditions are satisfied, the asynchronous trigger module 270 executes the associated action stored in the active master profile. Depending on the action, the asynchronous trigger module 270 causes the performance of the action by issuing calls through network interface 280 or the inventory interface 210.

The profile wizard 240, the event correlator 260, the asynchronous trigger module 270, and these interfaces 210, 220, and 280 are implemented in software and are executed by the processor in the computer 140.

An example of an application of the previously described system follows and is illustrated in FIGS. 3 and 4. A customer may have multiple networks such as one in Raleigh, another in Cincinnati, and another in San Jose. That customer may want to define rules of engagement which will apply when any of the customer's local network operators need to modify the services which are provided by their telecommunication carrier. For example, the customer may want to impose many requirements on the customer's local network operators when modifying or ordering voice circuits. One requirement may include automatically upgrading a committed information rate (CIR), if the permanent virtual circuit (PVC) traffic rate exceeds the CIR. A second requirement may include satisfying a condition before issuing an action such as analyzing the customer's current service inventory. For example, if a customer requests a new DS0 and after the DENS system analyzes the number of DS0s to which the customer currently subscribes, the customer may require that any new DS0 requests that exceed the total of DS0s within a trunk group over a threshold such as 8 DS0s would automatically change to a request to order a T1.5 and to convert the existing DS0s into channels to be carried over the newly ordered T1.5. A third requirement may include sending an email or page to the customer's telecommunications/information technology director every time a network operator orders a new T1.5 trunk. A fourth requirement may include specifying the default settings for elements required when ordering a new service. A fifth requirement may include requiring AT&T to provide virus alerts and protection using a traffic signature.

It is recognized that a customer may have many more requirements to be defined by the rules of engagement between the customer and the telecommunications service provider. For example, a customer may require that a periodic report be run on the inventory of services being subscribed to determine if the voice and data circuits can be combined between the different customer sites to achieve cost savings and that an analysis on all of the customer sites be run to determine if they all have disaster recovery options (DRO) specified. The customer may want any of the customer's sites that don't subscribe to DRO to subscribe to DRO at the same level as utilized by the most protected site.

To ensure that the customer rules of engagement are satisfied, the customer interacts with the DENS system to create an active master profile, also referred to as a proxy, to operate on the customer's behalf on each order transaction or event without the customer's direct involvement on each element of the transaction. Returning to the example, the customer first logs on to a business portal such as BusinessDirect®. The customer may access the business portal through various means including the Internet, an interactive voice response (IVR) unit, or other suitable medium. The business portal invokes the profile wizard 240. The profile wizard 240 communicates with the rules directory 230 and an inventory interface 210 to determine a dynamic decision tree tailored for the customer as shown in FIG. 3. Through the inventory interface 210, the profile wizard 240 determines that the customer has three locations and the inventory of services includes frame, asynchronous transfer mode (ATM), IP, and switched voice, for example. The inventory interface 210 allows the profile wizard 240 to collect data from many heterogeneous telecommunication systems such as an enterprise wide inventory system like AT&T's Database of Record (DBOR). Based on the information gathered through the inventory interface, the profile wizard 240 constructs a decision tree containing questions used to interview the customer. It is noted that there are two levels of dynamic decision tree construction. The first level includes determining a set of questions and their content relevant to the customer. The second level includes presenting a question from the set of relevant questions depending on the customer's response to previously presented questions and the current state of learned information gathered about the customer.

Continuing with the example, FIG. 3 illustrates an exemplary decision tree 300 constructed by the profile wizard in accordance with the present invention. The decision tree 300 includes an ordering decision branch 310 which addresses the second and third customer requirements, a congestion decision branch 320 which addresses the first customer requirement, a security decision branch 330 which address the fourth customer requirement, and a disconnect decision branch which addresses the telecommunication carrier's behavior when the customer unsubscribes from a particular service. Each decision branch illustrates the question progression to ask the logged on customer. By the DENS application analyzing the customer's inventory, the DENS application knows that the customer subscribes to DS0s, PVCs, and IP services. As a result, the profile wizard 240 constructs the decision tree 300 as shown.

Referring to the ordering decision branch 310, the profile wizard 240 constructs question 311 "Would you allow DS0 channel orders that put your DS0 group over 8 DS0s per location?" If the answer to question 311 is yes, the profile wizard 240 constructs question 312 "Would you like to upgrade locations that have more than 8 DS0s to a T1.5 line?" If the answer to question 312 is yes, the profile wizard 240 constructs question 314 "Would you like to disconnect all DS0s once the T1.5 line is turned up?" If the answer to question 316 is yes, the profile wizard 240 constructs question 316 "How would you like to be notified about the DS0 to T1.5 conversion? Email, PDA, IVR, web, or no notification?" Back to question 311, if the answer is no, the profile wizard 240 constructs question 313 "Would you like to convert DS0 orders putting you over the 8 DS0 limit to T1.5 line orders? If the answer to question 313 is yes, question 314 is constructed. If the answer to question 313 is no, an internal action to cancel the DS0 order is written to the master profile as described below in connection with FIG. 4. Back to question 312, if the answer is no, no special handling is recorded for this customer. Back to question 314, if the answer is no, an error is reported and the profile wizard communicates the error to the customer.

Referring to the congestion decision branch 320, the profile wizard 240 constructs question 322 "Would you like AT&T to upgrade your PVCs operating at data rates in excess of CIR?" If the answer to question 322 yes, the profile wizard 240 constructs question 324 "If a new CIR exceeds port capacity, would you like AT&T to upgrade your port as well?" If the answer to question 324 is yes, the profile wizard 240 constructs question 326 "If port capacity exceeds physical transport, would you like AT&T to upgrade your transport?" If the answer to question 326 is yes, the profile wizard 240 constructs the question 328 "How would you like to be notified about the upgrade? Email, PDA, VR, web, or no notification?" Returning to question 322, if the answer to question 322 is no, no special handling is required for this customer. Returning to question 324, if the answer to question 324 is no, an action to upgrade the PVC with a precondition to upgrade only if port capacity handles traffic are entered into the action field and precondition fields of the master profile as described in FIG. 4.

Turning to the security decision branch 330, the profile wizard 240 constructs question 332 "Would you like AT&T to attempt to detect virus sources by monitoring traffic ratio imbalance (TRI)?" If the answer to question 332 is yes, the profile wizard 240 constructs question 334 "If traffic imbalance is detected, would you like AT&T to terminate the source of traffic if it matches a virus signature?" If the answer to question 334 is yes, the profile wizard 240 constructs question 336 "How would you like to be notified about the termination? Email, PDA, IVR, web, or no notification?"

Turning to the disconnect decision branch 340, the profile wizard 240 constructs question 342 "Would you like service disconnects to be performed using the soft disconnect process?" If the answer to question 342 is yes, the profile wizard constructs question 344 "How would you like to be notified upon completion of the disconnect process? Email, PDA, IVR, web, or no notification?"

The profile wizard 240 tracks each selection made by the customer. After all the selections are made as described above in connection with FIG. 3, the profile wizard 240 creates a master profile for this customer storing events, actions, and optional conditions. The profile wizard 240 stores the master profile into the user profile database 250. FIG. 4 illustrates an exemplary active master profile 400 in accordance with the present invention. The active master profile 400 corresponds to the customer answering the questions illustrated in FIG. 3. Row 410 illustrates an exemplary entry concerning an ordering task when that task includes ordering a DS0. The event column 420 illustrates the event, the arrival of which will initiate the DENS application to determine whether to run the action or actions listed in action column 440. The precondition column 430 illustrates conditions that must be satisfied before the actions in column 440 are performed.

Referring to row 410, the ORDERING DS0 event element entry was determined by the existence of the ordering DS0 decision tree branch 310. The customer in the example, answered yes to the first question "Would you allow DS0 orders that put your DS0 group over 8 DS0s per location?" The customer also answered yes to the question 312 "Would you like to upgrade locations that have more than 8 DS0s to a T1.5?" By answering yes to question 312, the "Order T1.5" action was determined in the action column 440 and the precondition "DS0 exceed 8" was determined in precondition column 430. The customer also answered yes to question 314 "would you like to disconnect all DS0s once the T1.5 is turned up?" By answering yes to question 314, the actions "Disconnect the DS0s" and "Cancel DS0 order" were determined in the action column 440. The customer requests email notification to be sent to email address custdir@cus.com by answering question 316 "How would you like to be notified about the DS0 to T1.5 conversion?" By answering question 316, a "yes" is entered in notification column 460, the email address is entered in the type of notification column 460, and "internet" is entered in the medium for notification column 470. Although left blank for the ordering row 410, column 480 represents service specific data for the asynchronous trigger module 270 to perform its analysis, if needed. Similarly, decision branches 320, 330, and 340 translate into entries illustrated in rows 412, 414, and 416 to complete the customer's master profile. Upon completion of the customer interview, the profile wizard 240 writes the active master profile 400 to the user profile database 250.

Now that the customer's master profile has been created in the user profile database 250, the DENS application can operate as a proxy on behalf of the customer. For example, if the customer's network operator in Cincinnati orders a DS0 through an ordering system such as AT&T's Integrated Order Manager (IOM), the IOM creates an event called ORDERING DS0 for the Cincinnati site. The event along with the customer MCN is sent to the event correlator 260. The event correlator 260 analyzes the master user profile to determine if the customer has set the DS0 EXCEED 8 precondition by issuing a request through the inventory interface 210 to an inventory management system. If set, the event correlator 260 extracts current inventory for the Cincinnati site and calculates the total number of DS0s. If the order and inventory exceed the 8 threshold, the precondition DS0 EXCEED 8 is satisfied. Upon determining the customer's inventory consists of 8 DS0s which equals a predetermined threshold such that ordering a T11.5 would be a cost savings alternative than ordering one more DS0, the asynchronous trigger module 270 issues a request to the order system to either indicate to the network operator that a T1.5 trunk will be ordered according to the customer's requirements embodied in the active master profile. It is noted that it is contemplated by the present invention to give customers the ability to override actions in the master profile. For example, such an override may result in prompting the network operator to determine whether he would like to override the master profile rule of automatically ordering a T1.5 and just order an additional DS0.

The above examples are merely exemplary. As an alternative example, there may be two customers; customer ABC and customer XYZ. Customer ABC's business is driven by offering premiere customer service whereas customer XYZ's business is driven primarily by its costs. As such customer ABC may request that a telecommunication carrier grow shrink its voice and data capacity as needed to meet its customers demands that may fluctuate according to different holidays throughout the year. Customer ABC would be willing to pay the telecommunication carrier for receiving such a service since the capacity expansion and contraction can be performed without the involvement of the customer.

In contrast, customer XYZ's may want to exert complete control over the growth or contraction of voice and data capacity in network to preclude even the smallest transaction cost. The present invention advantageously addresses the needs of such diverse customers.

Upon reception of the event and satisfaction of the precondition, the asynchronous trigger module 270 retrieves the action corresponding to the ORDERING DSO event from the active master profile. In this example, the actions are to order a T1.5, disconnect the existing DS0s, and cancel the new DS0 order. The asynchronous trigger module 270 performs the operations to complete these actions.

FIG. 5A is a table 500 containing an exemplary non-exhaustive list of actions that may be performed in accordance with the present invention. Column 510 contains events that are received by the event correlator 260. Column 520 contains a short description of the corresponding event in column 510. For example, event 512 TRAFFIC RATIO IMBALANCE is received by the event correlator 260 when, as shown by event description 522, a system external to the DENS application detects that the ratio of denial of service traffic relative to all traffic exceeds a customer set ratio.

FIG. 5B is a table 550 containing an exemplary non-exhaustive list of actions that may be performed in accordance with the present invention. Column 560 contains actions to be performed or caused to be performed by the asynchronous trigger module 270. Column 570 contains a short description of the corresponding action in column 560. For example, action 562 UPGRADE PVC is explained by short description 572 which states to "perform a MACD order to upgrade PVC CIR based on the next available PVC speed and not to exceed the ports capacity rules."

Figure 6:
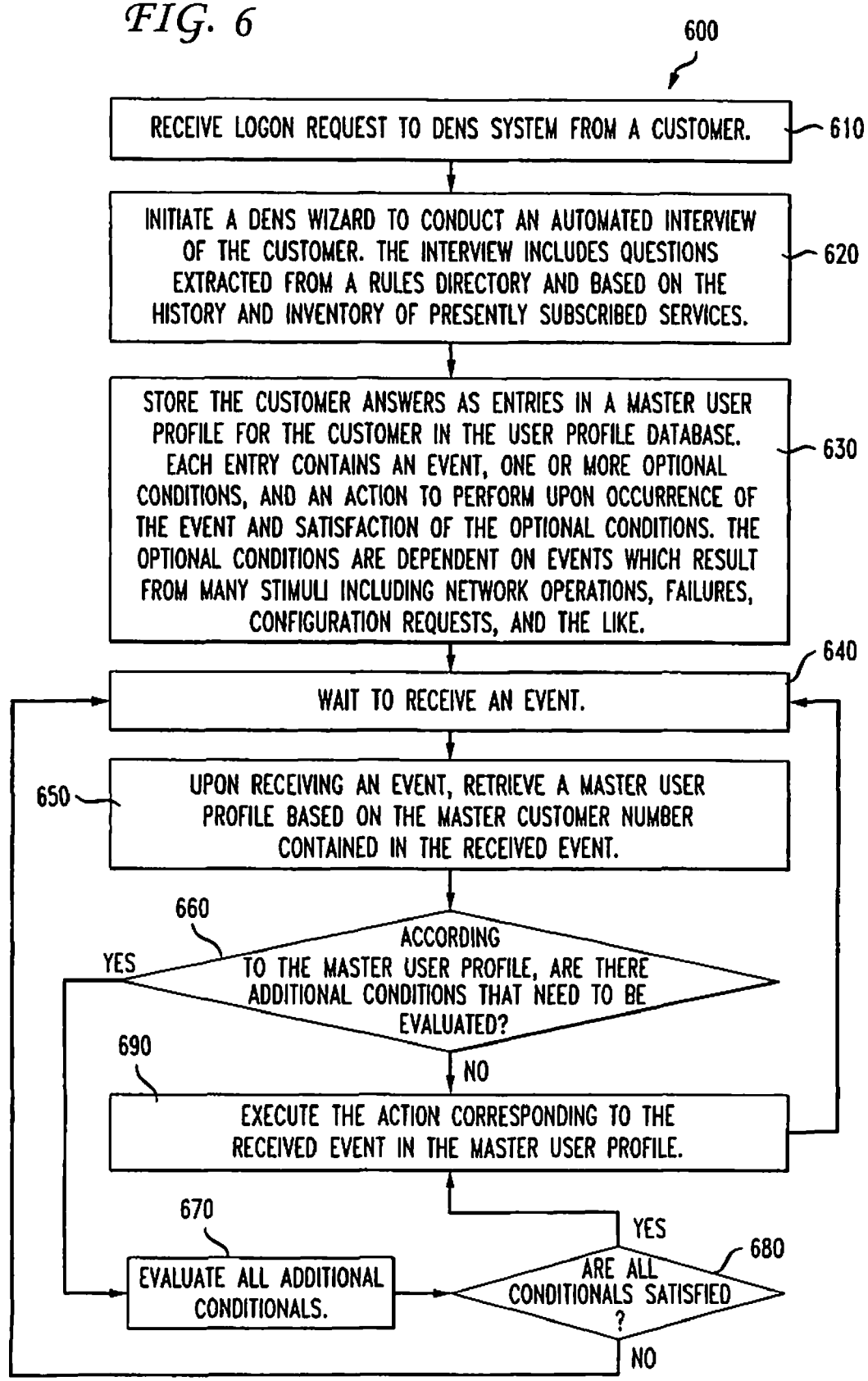
FIG. 6 is a flowchart illustrating a method of manifesting a customer relationship embodied within an active master customer profile.

FIG. 6 is a flowchart illustrating a method 600 of manifesting a customer relationship embodied within a master user profile. At step 610, the DENS system receives a logon request from a customer. At step 620, a DENS wizard is initiated to conduct an automated interview of the customer. The interview contains questions which may be tailored to the particular customer based on any combination of historical customer information, customer inventory of presently subscribed services, and answers to previously answered questions. At step 630, the customer answers are stored as entries in a master user profile for the customer. Each entry contains an event, one or more optional predetermined conditions, and an action to execute upon the occurrence of an event and satisfaction of the optional predetermined conditions. At step 640, the method 600 waits for the occurrence of an event which is stored in the master user profile for the customer.

Referring to step 650, once an event is received, a master user profile corresponding to the master customer number contained in the received event is retrieved. At step 660, an entry of the master user profile corresponding to the received event is analyzed to determine whether there are optional predetermined conditions that need to be evaluated. If there are no optional conditions to evaluate, the method proceeds to step 690 where the action corresponding to the received event in the master user profile is executed. Upon execution of the action, the method proceeds to step 640 to wait for the next event.

Returning to step 660, if it had been determined that there are optional conditions to evaluate, the method 600 proceeds to step 670 where all the optional conditions are evaluated. These optional conditions may include evaluating the current state of the customer's network. At step 680, the method determines whether all the optional conditions are satisfied. If so, the method 600 proceeds to step 690. If not, the method 600 proceeds to step 640 to wait for the next event.

It should be understood that although in the preferred embodiment of the invention the profile wizard, event correlator, asynchronous trigger module and their corresponding interfaces are implemented in software, in other embodiments of the invention all or portions of the instruction steps executed by these software portions may be resident in any of these components in firmware or in other program media in connection with one or more computers, which are operative to communicate with existing telecommunication systems.

While the present invention has been disclosed in the context of various aspects of presently preferred embodiments, it will be recognized that the invention may be suitably applied to other environments consistent with the claims which follow.

What is claimed is:

1. A method, comprising:
responsive to a determination that a permanent virtual circuit of a customer is operating at a data rate in excess of a committed information rate, automatically reporting that the permanent virtual circuit has been automatically upgraded, the permanent virtual circuit automatically upgraded responsive based upon a defined rule stored in a master user profile, the defined rule adapted to cause an automatic addition of a DS0 channel that causes a count of DS0 channels to exceed a threshold of DS0 channels, which causes an automatic order to transfer existing DS0 channels to a new T1.5 trunk; and
creating a dynamic decision tree of questions to ask the customer, the decision tree describing a progression of questions to ask the customer considering potential customer answers, the dynamic decision tree comprising an ordering decision branch, a congestion decision branch, a security division branch, and a disconnect decision branch, the disconnect decision branch adapted to automatically perform at least one action responsive to the customer unsubscribing from a particular service, updating the master user profile based upon answers of the customer to questions from the dynamic decision tree.

2. The method of claim 1, further comprising:
for the permanent virtual circuit, automatically reporting voice circuit utilization, bandwidth utilization, and a data rate offered by the customer to a managed network versus a data rate purchased by the customer.

3. The method of claim 1, further comprising:
receiving an event to be matched with an associated event stored in the master user profile; and
based upon a found rule in the master user profile corresponding to the received event, performing an action in response to the received event.

4. The method of claim 1, further comprising:
based upon a found rule stored in the master user profile, performing an action consistent with business policies and procedures of the customer, the action determined via an event correlator adapted to filter duplicate events that arise because of an alarm caused by a failure.

5. The method of claim 1, further comprising:
received an event defined in the master user profile, the event associated with the permanent virtual circuit, the event received from one of a billing system, an alarm system, a trouble ticket and test system, an ordering system, an inventory system, or a network of the customer.

6. The method of claim 1, wherein:
the master user profile is adapted to define rules of engagement of how a telecommunication carrier shall operate on behalf of the customer on transactions associated with the permanent virtual circuit without subsequent direct involvement of the customer regarding the transactions.

7. The method of claim 1, wherein:
entries in the master user profile have an associated event and an action representing an operation to perform in response to an occurrence of an associated event.

8. The method of claim 1, wherein:
customer answers stored in the master user profile comprise an inventory of presently customer subscribed services, history of services purchased by the customer, or answers to previously answered questions.

9. The method of claim 1, further comprising:
sending at least one request to a private telecommunication system associated with the permanent virtual circuit for an action to be performed on the private telecommunication system, the action determined based upon a found rule of the master user profile, the found rule corresponding to a received event associated with the permanent virtual circuit.

10. A method, comprising:
responsive to a determination that a permanent virtual circuit of a customer is operating at a data rate in excess of a committed information rate, automatically reporting that the permanent virtual circuit has been automatically upgraded, the permanent virtual circuit automatically upgraded responsive based upon a defined rule stored in a master user profile, the defined rule adapted to cause an automatic addition of a DS0 channel that causes a count of DS0 channels to exceed a threshold of DS0 channels, which causes an automatic order to transfer existing DS0 channels to a new T1.5 trunk; and retrieving the master user profile based on a stored master customer number carried in a received event associated with the permanent virtual circuit; and selecting an action to perform upon matching the received event with an associated event in the retrieved master user profile, the action selected responsive to a detected virus condition, the virus condition detected via traffic signatures, the action comprising an alert of the detected virus condition.

11. The method of claim 10, further comprising:

storing a master customer number uniquely identifying the customer in the master user profile and wherein a received event associated with the permanent virtual circuit includes the master customer number.

12. A method, comprising:

responsive to a determination that a permanent virtual circuit of a customer is operating at a data rate in excess of a committed information rate, automatically reporting that the permanent virtual circuit has been automatically upgraded, the permanent virtual circuit automatically upgraded responsive based upon a defined rule stored in a master user profile, the defined rule adapted to cause an automatic addition of a DS0 channel that causes a count of DS0 channels to exceed a threshold of DS0 channels, which causes an automatic order to transfer existing DS0 channels to a new T1.5 trunk; and storing a master customer number uniquely identifying the customer in the master user profile and wherein a received event associated with the permanent virtual circuit includes the master customer number; and sending at least one request to a private telecommunication system associated with the permanent virtual circuit for an action to be performed on the private telecommunication system, the action determined based upon a found rule of the master user profile, the found rule corresponding to a received event associated with the permanent virtual circuit.

13. The method of claim 12, further comprising:

responsive to the master user profile, automatically detecting that a ratio of denial of service traffic relative to all traffic exceeds a customer set ratio, the customer set ratio associated with the permanent virtual circuit.

14. A method, comprising:

responsive to a determination that a permanent virtual circuit of a customer is operating at a data rate in excess of a committed information rate, automatically reporting that the permanent virtual circuit has been automatically upgraded, the permanent virtual circuit automatically upgraded responsive based upon a defined rule stored in a master user profile, the defined rule adapted to cause an automatic addition of a DS0 channel that causes a count of DS0 channels to exceed a threshold of DS0 channels, which causes an automatic order to transfer existing DS0 channels to a new T1.5 trunk; and an event defined in the master user profile is an indication that the customer is offering data traffic over the permanent virtual circuit at data rates in excess of a subscribed data rate and wherein an action defined in the master user profile comprises automatically notifying the customer to increase the subscribed data rate to match an established data rate need of the customer; and an entry of the master user profile comprises a predetermined condition to be satisfied in addition to receiving an event occurrence before performing an action, the predetermined condition comprising a determination that a combination of voice and data circuits of different customer sites achieves a cost savings and that all sites of the customer have specified disaster recovery options.

15. A method, comprising:

running a wizard program, the wizard program adapted, responsive to a received indication of network congestion, cause additional network bandwidth to be automatically ordered at an end of a budget cycle of a company, the indication of network congestion received prior to the end of the budget cycle, the additional network bandwidth ordered based upon a rule defined in a master customer profile, the rule indicative of a customer-provided instruction to order additional bandwidth upon occurrence of an event indicative of network congestion, the wizard program adapted to create a reporting rule in the master customer profile, the reporting rule adapted to, responsive to an automatic detection that a ratio of denial of service traffic relative to all traffic exceeds a customer set ratio, automatically report the denial of service traffic to the customer;

an event correlator adapted for receiving an event and determining that the event correlates to a found rule in the master customer profile, the event correlator adapted to filter duplicate events; and an asynchronous trigger module adapted for:
  reading the master customer profile based on the event; and
  automatically determining to order the additional network bandwidth.

16. A method, comprising:

responsive to a determination that a permanent virtual circuit of a customer is operating at a data rate in excess of a committed information rate, automatically reporting that the permanent virtual circuit has been automatically upgraded, the permanent virtual circuit automatically upgraded responsive based upon a defined rule stored in a master user profile, the defined rule adapted to cause an automatic addition of a DS0 channel that causes a count of DS0 channels to exceed a threshold of DS0 channels, which causes an automatic order to transfer existing DS0 channels to a new T1.5 trunk; and responsive to the master user profile, automatically detecting that a ratio of denial of service traffic relative to all traffic exceeds a customer set ratio, the customer set ratio associated with the permanent virtual circuit; and retrieving the master user profile based on a stored master customer number carried in a received event associated with the permanent virtual circuit; and selecting an action to perform upon matching the received event with an associated event in the retrieved master user profile, the action selected responsive to a detected virus condition, the virus condition detected via traffic signatures, the action comprising an alert of the detected virus condition.

17. The method of claim 16, further comprising:

notifying the customer to increase a subscribed data rate of the permanent virtual circuit to match an established data rate need of the customer.

\* \* \* \* \*